(12) United States Patent
Lau

(10) Patent No.: US 6,237,763 B1
(45) Date of Patent: May 29, 2001

(54) DISK PROTECTION ENCLOSURE

(76) Inventor: Kwok Din Lau, 13A, Sze Hing Loong Building, 44 Lee Chung Street, Chai Wan (HK)

( * ) Notice: Subject to any disclaimer, the term of this patent is extended or adjusted under 35 U.S.C. 154(b) by 0 days.

(21) Appl. No.: 09/569,162

(22) Filed: May 11, 2000

(51) Int. Cl.$^7$ .................................................. B65D 85/57
(52) U.S. Cl. ...................................... 206/308.1; 206/310
(58) Field of Search ...................... 206/308.1, 309–313, 206/493, 307

(56) References Cited

U.S. PATENT DOCUMENTS

| | | | |
|---|---|---|---|
| 5,400,902 | * | 3/1995 | Kaminski ............................ 206/310 |
| 5,526,926 | * | 6/1996 | Deja .................................. 206/308.1 |
| 5,788,068 | * | 8/1998 | Fraser et al. ......................... 206/310 |
| 5,829,582 | | 11/1998 | Ippolito et al. . |
| 5,944,181 | | 8/1999 | Lau . |
| 5,988,375 | * | 11/1999 | Chang ................................ 206/310 |
| 5,996,788 | * | 12/1999 | Belden, Jr. et al. .................. 206/310 |
| 6,065,594 | * | 5/2000 | Sankey et al. ....................... 206/310 |
| 6,085,900 | * | 7/2000 | Wong ................................ 206/308.1 |

FOREIGN PATENT DOCUMENTS

| | | |
|---|---|---|
| 3425579 | 1/1986 | (DE) . |
| 0429195 | 10/1990 | (GB) . |

\* cited by examiner

Primary Examiner—Paul T. Sewell
Assistant Examiner—Luan K. Bui
(74) Attorney, Agent, or Firm—Sheldon & Mak (57) ABSTRACT

A disk enclosure includes a base panel; a pedestal projecting forwardly from the base and including a ring structure having a plurality of circumferential spring arches for biasingly contacting the disk, a central button portion having segments with retainer and stem elements; respective arm members supporting the button segments in cantilevered relation to the ring structure, the arm members having a relaxed position for retaining the disk by the retainer members contacting a front disk face proximate its central opening, the arm members being deflectable axially rearwardly to a depressed position for inward and rearward movement of the button segments permitting passage through the opening, the spring arches displacing the disk axially forwardly relative to the retainer portions as the arm members reach the depressed position. Rear surfaces of the retainer elements have outwardly and forwardly extending extremities for facilitating disk engagement. Front button surfaces slope forwardly and inwardly from outer extremities of the retainer elements for ramped engagement with the central opening during disk insertion. The arm members have spring hinges at the ring structure, thereby reducing the axial displacement of the retainer elements sufficient for passage through the central opening of the disk. An edge support has a shoulder forward of the panel portion for contacting the rear disk surface proximate its perimeter, a portion of the support extending further forwardly for protecting the disk perimeter. The shoulder surface is spaced rearwardly of the ring structure for avoiding strain within the disk.

14 Claims, 5 Drawing Sheets

DISK PROTECTION ENCLOSURE

BACKGROUND

The present invention relates to optical data disks such as compact disks (CDs) and video disks (DVDs) that have central circular locating openings, and more particularly to devices for protectively enclosing such disks for storage of same.

Data disks such as compact disks and video disks typically have large amounts of digitally stored information that is optically readable through a transparent bottom layer of the disk by a movable head during rotation of the disk. The information is arranged in one or more tracks that are covered by a thin protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Protective containers for the disks in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions. U.S. Pat. No. 5,685,427 to Kuitems et al. discloses a compact disk holder having a central post that projects from a shoulder surface, the post having an outwardly facing ridge for gripping the disk opposite the shoulder surface. The post is formed with spiral slots for contraction of segments in response to finger pressure. A disadvantage of the holder of Kuitems is that it is difficult to use in that excessive finger pressure is required for contracting the segments; conversely, if the segments are made sufficiently long and thin for contracting under reasonable finger pressure, they are too weak to be effective in holding the disk.

U.S. Pat. No. 5,526,926 to Deja discloses a disk storage case having a segmented central pin that is formed with an outwardly projecting collar for gripping the central hole of the disk, the pin being connected to an outwardly projecting plurality of lifting fingers that pivot upwardly when the pin is contracted by pressure on a central push-button. A disadvantage of the case of Deja is that the fingers are ineffective in that they must be sufficiently elastic to permit depression of the push-button prior to actual lifting of the disk, and they do not retain sufficient elastic strength for reliably lifting the disk, in that projection portions of the fingers have limited length. UK Patent Application No. 2,291,640 (and U.S. Pat. No. 5,788,068) by Fraser et al. discloses a compact disk holder having a bifurcated button supported on respective inwardly projecting spring arms, segments of the button being interconnected by a living hinge in some embodiments. Also, some embodiments have a plurality of inwardly projecting disk ejection spring arms spaced about the button for lifting the disk when the button is depressed. Other embodiments rely on an outer ledge for support of the disk, which flexes when the button is depressed, the center portion of the disk being lifted by resilience of the disk when the button is sufficiently depressed to effect disengagement. The holder of Fraser et al. has a number of disadvantages. For example:

1. The ejection spring arms are prone to be damaged by being snagged by objects such as a user's clothing;

2. The disk is subject to damage by rubbing of the ejection spring arms; and

3. The flexing of the disk is ineffective in reliably completing disengagement from the button in the absence of the ejection spring arms.

Thus there is a need for a protective disk container that overcomes the disadvantages of the prior art.

SUMMARY

The present invention meets this need by providing a molded disk holder configuration wherein structural components are unlikely to be snagged or damaged during normal use and handling, and that is particularly effective and easy to use. In one aspect of the invention, a holder for a disk having a central opening and front and back face surfaces with a data region extending inwardly to about twice the diameter of the central opening includes a base having a panel portion; a pedestal projecting forwardly from the base on a pedestal axis, the pedestal including a central button portion having a plurality of radially outwardly projecting retainer members and a plurality of axially extending stem members; a plurality of arm members supporting the retainer members and the stem members of the button portion in cantilevered relation to the base, the arm members sloping radially inwardly and axially forwardly from the panel portion of the base, the arm members collectively having a relaxed position, an engaged position for retaining the disk by engagement of the front face surface by the retainer members proximate the central opening, free end extremities of the arm members being deflectable axially rearwardly from the extended position to a depressed position in response to applied pressure against the button portion for producing sufficient corresponding radially inward and axially rearward movement of the retainer members and the stem members to permit passage of the retainer portions and the stem portions through the central opening of the disk; and a ring structure having a plurality of circumferential spring portions for biasingly contacting the rear face surface of the disk inside the data region for displacing the disk axially forwardly relative to the retainer portions when the arm members are in the depressed position, the disk being moved forwardly by the spring portions as the arms are moved to the depressed position.

Preferably each of the spring portions has a deflectable arch member having opposite ends supported by the base for permitting axial movement of the disk deflecting the spring portions without rubbing contact with the disk. The arch members can be located circumferentially between adjacent arm members. Preferably the ring structure further includes skirt members that project inwardly from proximate the arch members for protecting the arch members.

The stem portions can be integrally formed as button segments with corresponding ones of the retainer members. Preferably rearwardly facing engagement surfaces of the retainer members have outwardly and forwardly extending extremities for facilitating disk engagement. Preferably forwardly facing surfaces of the button surfaces slope forwardly and inwardly from outer extremities of the retainer members to respective forward extremities of the button segments, the forward extremities being sufficiently confined for ramped engagement with the central opening in the extended position of the arm members.

The arm members can be supported by the ring structure, extending inwardly therefrom. Root extremities of the arm members are preferably connected to the ring structure by respective spring hinges that allow the arm members to deflect principally at the spring hinges, thereby reducing the axial displacement of the retainer members that is required for sufficient inward radial displacement for the retainer members to pass through the central opening of the disk. Preferably the ring structure further includes a plurality of skirt members extending between adjacent pairs of the arm members and being closely spaced therefrom for shielding the arm members.

The base portion can further include an edge support member projecting forwardly from the panel portion and having a shoulder surface for contacting the rear surface of the disk proximate a perimeter extremity thereof, a portion of the support member extending forwardly of the shoulder surface in concentric relation to the pedestal axis for protecting an edge portion of the disk, the edge support member also having a pair of finger depressions on opposite sides of the pedestal axis for permitting the disk to be gripped by a user's fingers when the disk extends proximate the shoulder surface. The shoulder surface can be interrupted by the finger depressions. Preferably the shoulder surface is spaced from the disk in the engaged position of the arm members for avoiding strain within the disk.

DRAWINGS

These and other features, aspects, and advantages of the present invention will become better understood with reference to the following description, appended claims, and accompanying drawings, where:

DESCRIPTION

The present invention is directed to a disk container that is particularly effective for protectively storing disks such as CDS and DVDs. With reference to FIGS. 1–15 of the drawings, a DVD box 10 includes a case 12 having a transparent jacket 13 bonded thereto for displaying printed material (not shown), the case having a base portion 14 a lid portion 16, and a hinge portion 18 that movably connects the base and hinge portions. In an exemplary configuration, the case 12 is an integrally formed molded member, so-called "living hinges" being formed along opposite edges of the hinge portion 18. The base and lid portions 14 and 16 include respective panel portions 17 and 19, and respective perimeter side portions 17S and 19S that snap together in edgewise adjacency in a closed condition of the box 10, the hinge portion 18 and the side portions 17S and 18S together forming four side walls of the case 12, the lid panel portion 17 forming a front wall, the base panel portion 19 forming a rear wall. The jacket 13 is bonded to the panel portions 17 and 19 along respective perimeter edge portions thereof opposite the hinge portion, being open otherwise for facilitating insertion of the printed material being configured for covering substantially all of the outer surface of the panel portions 17 and 19 and the hinge portion 18. In further description of the case 12, the terms "front" and "forward" with respect to the base refer to a direction toward the lid portion 16 in the closed condition of the box 10; conversely, "rear", "rearward", and "back" refer to a direction away from the lid portion.

Figures 1, 1A, 1B:
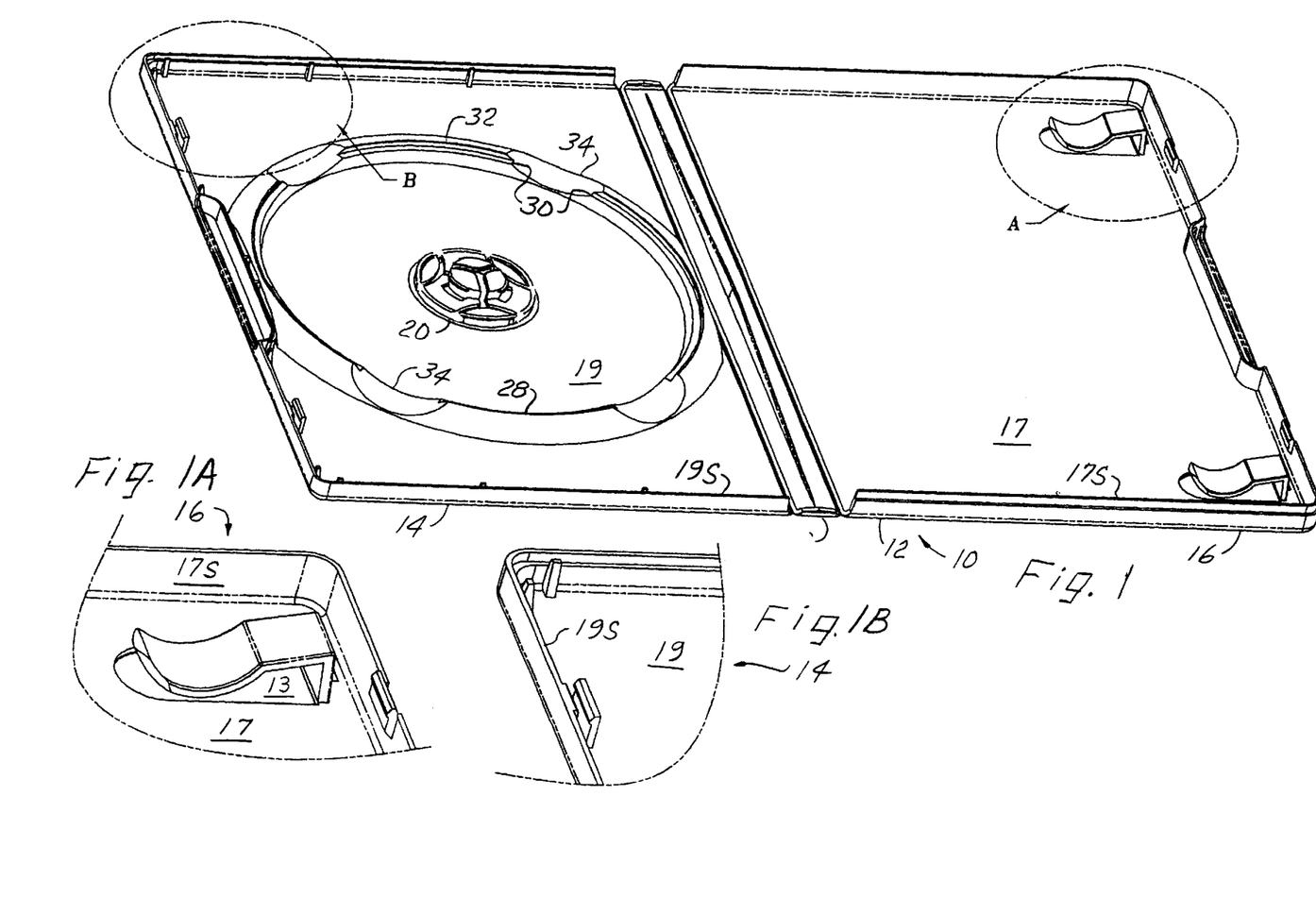
FIG. 1 is a perspective view of a protective disk container according to the present invention, the container being in an open condition.
FIG. 1A is a perspective detail view within region A of FIG. 1.
FIG. 1B is a perspective detail view within region B of FIG. 1.
Figure 2:
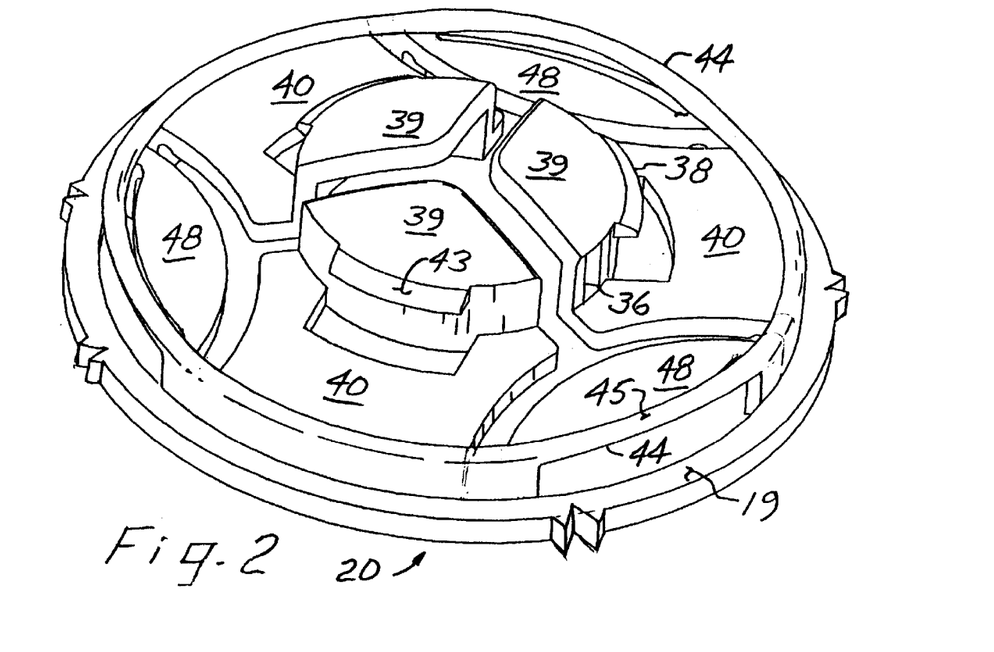
FIG. 2 is a perspective view detailing a central pedestal portion of the container of FIG. 1, the pedestal portion being in a relaxed condition.
Figure 3:
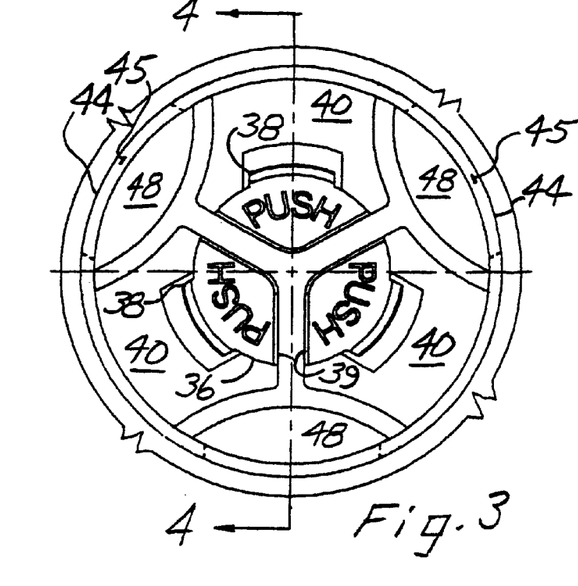
FIG. 3 is a plan view of the pedestal portion of Fig, 2.
Figure 4:
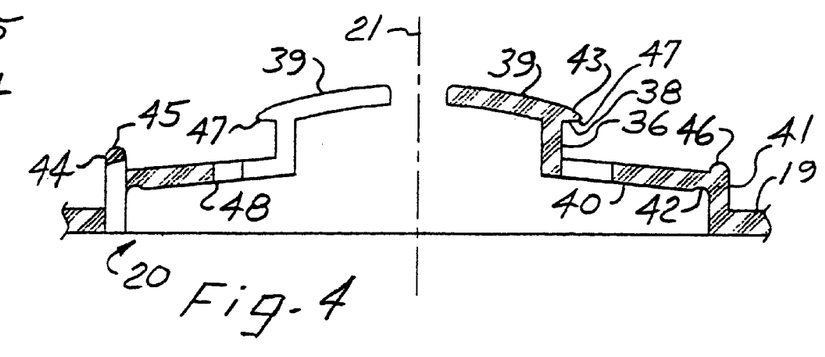
FIG. 4 is a sectional view on line 4—4 of FIG. 3.

A pedestal 20 of the case projects forwardly from the panel portion 19 of the base 14 on a pedestal axis 21 for supportively engaging a digital video disk 22 having front and rear face surfaces 23 and 24, a circular central opening 25, and a periphery 26, a data region 27 of the disk extending inwardly from proximate the periphery and having an inside diameter somewhat greater than that of the central opening 25. An edge-support portion 28 of case 12 also projects forwardly on the panel portion 19 in concentric relation to the pedestal axis 21 proximate the periphery 26 of the disk 22. The edge-support portion 28 is formed with an edge shoulder 30 for stabilizing the disk 22 against tipping, and a rim portion 32 that projects forwardly of the shoulder 30.for protecting the disk 22 proximate the periphery 26 while the disk is engaged with the pedestal 20. The edge-support portion is also formed with at least one pair of finger depressions 34 for permitting opposite perimeter portions of the disk 22 to be grasped by a user of the container 10, the edge shoulder 30 and the rim portion 32 being interrupted by the finger depressions 34.

Figure 6:
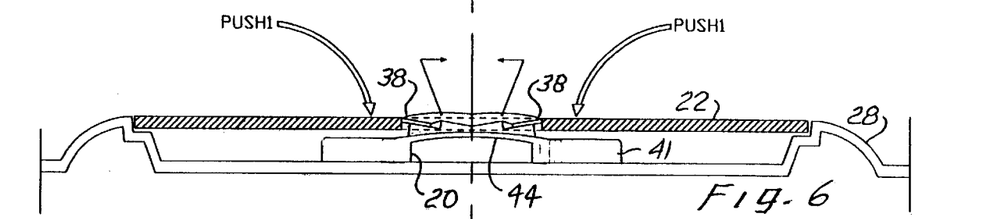
FIG. 6 is a detail view as in FIG. 5, showing the disk pressed into a first stage of engagement with the pedestal.
Figure 7:
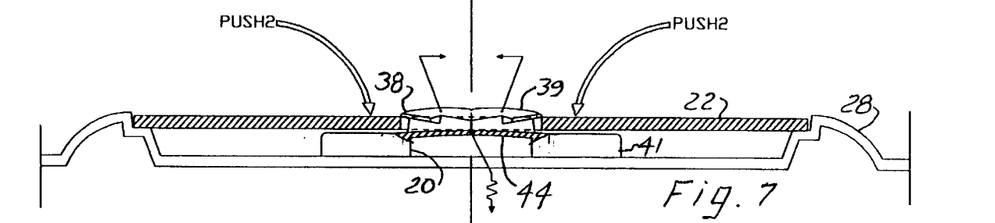
FIG. 7 is a detail view as in FIG. 5, showing the disk further pressed into a second stage of engagement with the pedestal.
Figure 8:
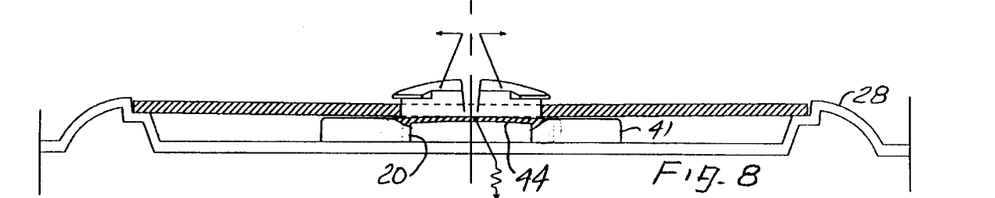
FIG. 8 is a detail view as in FIG. 5, showing the disk pressed into a third stage of engagement with the pedestal.
Figure 9:
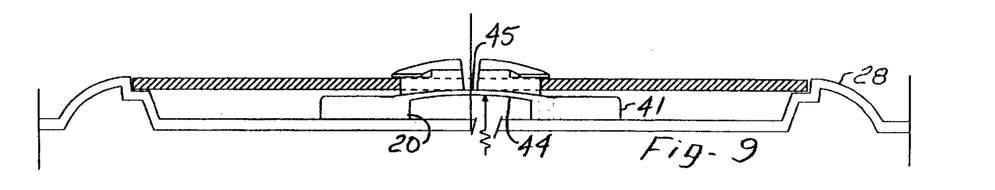
FIG. 9 is a detail view as in FIG. 5, showing the disk in final engagement with the pedestal.
Figure 11:
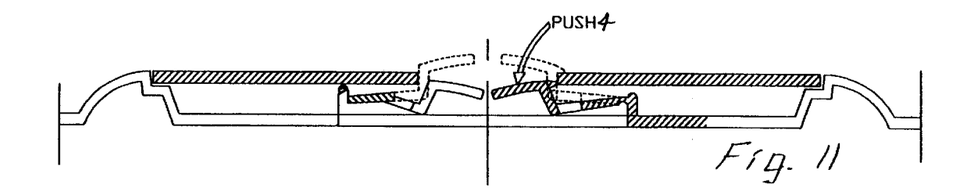
FIG. 11 is a detail view as in FIG. 9 but oriented as in FIG. 10, showing the disk in a second stage of disengagement with the pedestal.

According to the present invention, the pedestal 20 is formed with a plurality of stem portions 36 for engaging the central opening 25 of the disk, and retainer portions 38 outwardly projecting therefrom for engaging the front surface 23 at the opening 25, respective ones of the stem portions 36 and retainer portions 38 being integrally formed as corresponding button segments 39. The button segments 39 are angularly spaced about the pedestal axis 21 and supported at free ends of respective arm members 40 that are cantilevered inwardly within a ring structure 41. The ring structure 41 projects forwardly from the base panel portion 19 for supporting the disk 22 inside of the data region 27 in parallel-spaced relation to the panel portion 19. The arm members 40 are sufficiently flexible for movement between a relaxed position wherein the disk is confined between the retainer portions 38 and the ring structure 41, stem portions 36 projecting through the central opening 25 as shown in FIG. 9, and a depressed position wherein the retainer portions 38 and the stem portions 36 are displaced axially rearwardly and radially inwardly for clearing the central opening 25 as shown in FIGS. 6 and 11.

Preferably the arm members 40 are undercut at root extremities thereof connecting the ring structure 41 for forming respective spring hinges 42 for concentrating the flexing at that location. By this means, sufficient radial displacement of the button segments 39 for passage of the retainer portions 38 through the central opening of the disk is attained with reduced axial displacement than otherwise would be required. The button segments 39 each have a conical chamfer surface 43 that extends to outer extremities of the stem and retainer portions 36 and 38 for facilitating entry of the retainer portions 38 into the central opening 25 of the disk 22. The ring structure 41 also includes an angularly spaced plurality of forwardly projecting flexible arch members 44 having respective contact portions 45 for permitting the disk 22 to be displaced axially rearwardly toward base panel 19 in response to finger pressure applied against the rear surface 24 for facilitating passage of the retainer portions 38 into the central opening 25, the ring structure further including rigid land surfaces 46 for limiting the rearward displacement of the disk. Outer extremities of the button segment retainer portions 38 have ramp contours 47 for further facilitating engagement and disengagement of the retainer portions with the front disk surface 23 as described below.

The arm members 40 are also protected from breakage or permanent deformation by a plurality of skirt members 48 that extend inwardly from the ring structure 41 in approximately coplanar relation to the arm members 40, each of the skirt members 48 being closely spaced edgewise from an adjacent pair of the arm members 40. In the relaxed condition of the pedestal 20, the arm members 40 in combination with the skirt members 48 form an advantageously smooth, generally planar front surface of the pedestal 20 that extends inwardly from the ring structure 41 to the stem portions 36. Thus the arm members 40 are protected from being bumped or snagged by extraneous objects such as clothing during normal handling of the container 10 when the disk 22 is removed and the lid portion 16 is open.

Figure 5:
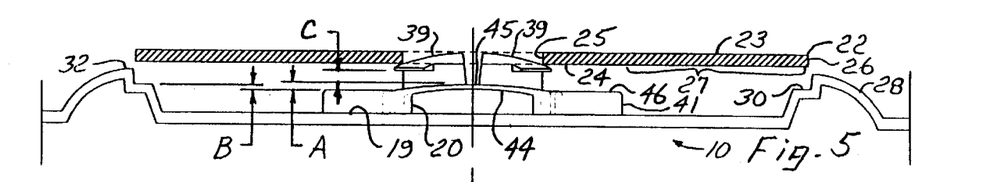
FIG. 5 is a fragmentary sectional elevational view, showing a disk positioned preparatory to engagement with the pedestal portion of FIG. 2.

With particular reference to FIGS. 5–9, a disk engagement sequence of the apparatus 10 includes an initial or first stage of placement of the disk 22 against the button segments 39 with the central opening 25 contacting the chamfer surfaces 43 thereof as shown in FIG. 5. A second stage of engagement is obtained using finger pressure against the disk at locations inside the ring structure 41 as indicated by the arrows designated PUSH1 in FIG. 6, the retainer portions of the button segments 39 being retracted and passing through the central opening 25 as indicated by the inwardly directed arrows. In a third stage of engagement, with further finger pressure as indicated by the arrows designated PUSH2 in FIG., 7, the rear surface 24 of the disk contacts and begins deflecting the arch members 44 during continued retraction of the retainer portions 38 as indicated by the downwardly directed arrow, the outward extremities of the retainer portions 38 passing fully through the opening 25. At this point, a fourth stage of engagement is reached wherein the retainer portions 38 are permitted to move outwardly as indicated by the outwardly directed arrows in FIG. 8 during continued deflection of the arch members 38. In the fourth stage of engagement, downward deflection of the arch members 44 is limited by the disk 22 contacting the rigid land surfaces 46 of the ring structure 41 that extend between the arch members 44. In a final stage of engagement, the arch members 41 relax as indicated by the upwardly directed arrow in FIG. 9 when finger pressure is removed from the disk, thereby lifting at least the center portion of the disk. When the disk 22 is latched onto the pedestal 20 with the retainer portions 38 retaining the front disk surface 23, the back disk surface 24 rests on or proximate the contact portions 45 of the arch members 44, the disk preferably assuming a relaxed condition in which it is free to rotate on the pedestal 20.

Figure 10:
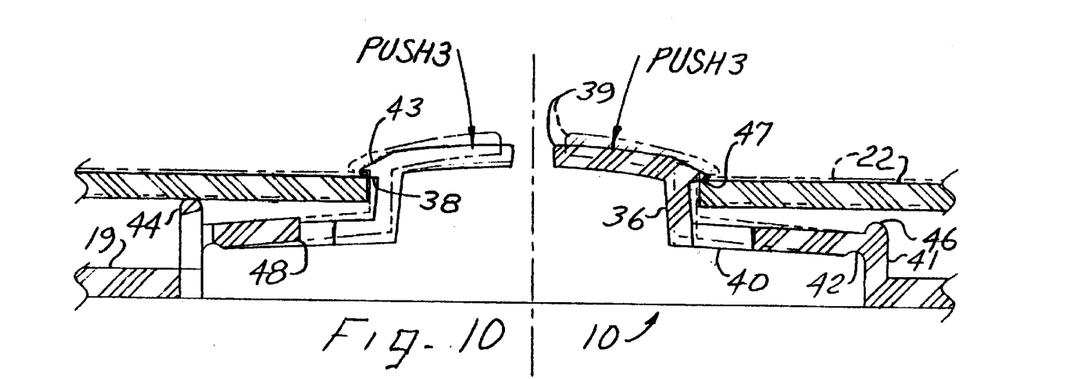
FIG. 10 is a detail view as in FIG. 4, showing the disk in a first stage of disengagement with the pedestal.
Figure 12:
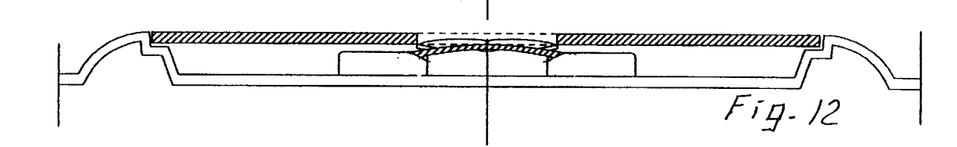
FIG. 12 is a detail view as in FIG. 9, showing the disk in a third stage of disengagement with the pedestal.
Figure 13:
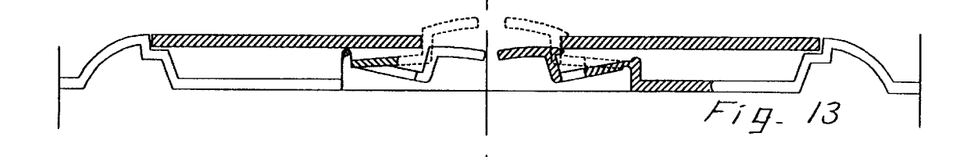
FIG. 13 is a detail view as in FIG. 12, but oriented as in FIG. 10.
Figure 14:
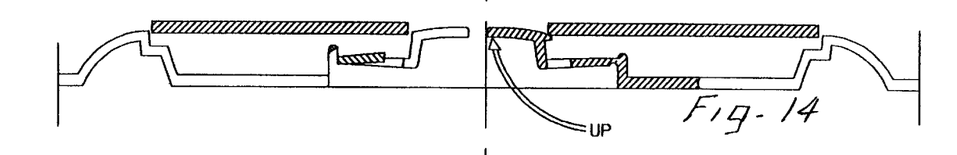
FIG. 14 is a detail view as in FIG. 13, showing the disk in a fourth stage of disengagement with the pedestal.
Figure 15:
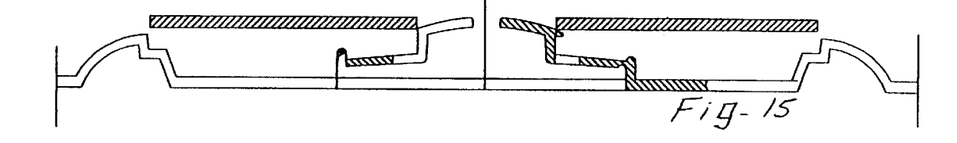
FIG. 15 is a detail view as in FIG. 13, showing the disk in a final stage of disengagement with the pedestal.
Figure 16:
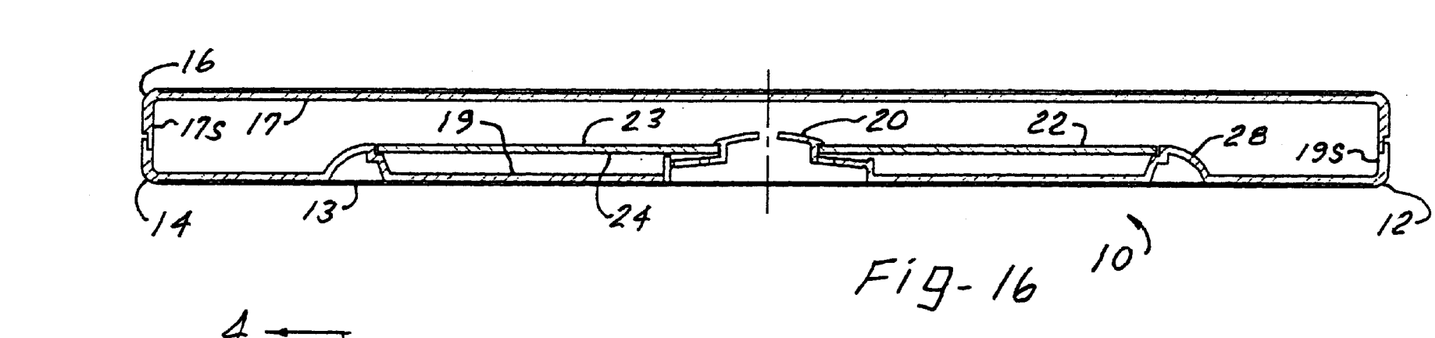
FIG. 16 is a sectional elevational view of the container of FIG. 1 in a closed condition with the pedestal supporting the disk as in FIG. 9.

With particular reference to FIGS. 10–15, a disengagement sequence of the apparatus 10 includes a first stage wherein the button segments 39 are depressed by finger pressure as indicated by the arrow designated PUSH3 in FIG. 10, downward movement of the disk 22 being resisted by the arch members 44. As the button segments 39 are depressed, they begin to retract as described above, and the ramp surfaces 47 slide inwardly on the disk 22 at the intersection of the front surface 23 and the central opening 25 until outer extremities of the retainer portions enter the opening 25. FIG. 11 shows a second stage of disengagement wherein the retainer portions 38 have entered and are passing through the central opening 25 in response to increased applied finger pressure as indicated by the arrow designated PUSH4, reaching a third stage of disengagement as shown in FIGS. 12 and 13 wherein outermost extremities of the retainer portions 38 emerge from the bottom of the central opening 25, the disk having been lifted slightly in response to unloading of the arch members 44. In a fourth stage of disengagement, in response to decreasing applied finger pressure, the button segments move upwardly as indicated in FIG. 14 by the arrow designated UP in response to unloading of the spring hinges 42, the disk being lifted by the retainer portions 38. In a final stage of disengagement shown in FIG. 15, the disk rests in a lifted position on the button segments 39, the arm members 40 having returned substantially to their relaxed position.

Typically, the disk container 10 of the present invention is configured for conventional disks having an outside diameter of 120 mm, an inside diameter of 15 mm, and a thickness of between 1.2 mm and 1.3 mm. In such applications, the stem portions 36 preferably inscribe a diameter of slightly less than the inside diameter of the disk, from 14.5 mm to 14.8 mm being appropriate, the retainer portions 38 correspondingly inscribing a diameter of from 16 mm to 17.4 mm. In an exemplary and preferred embodiment shown in the drawings, the dicribed by the retainer portions 38 is approximately 16.4 mm, the ramp surface 47 being defined by a full radius of approximately 0.25 mm, the chamfer surface 43 being oriented at an angle of approximately 30° from the plane of the disk 22, being within a suitable range of from 10° to 45°. As shown in FIG. 5, the arch member 44 projects a distance A above the rigid land surface 46 of the ring structure 41, the edge shoulder 30 of the support portion 28 being offset by a distance B above the land surface 46, and the retainer portions 38 are spaced by a distance C above the arch member 44 in the relaxed position thereof. The distance C is preferably somewhat greater than the thickness of the disk 22 for permitting the button segments 39 to be depressed significantly before the arch members 44 begin to deflect in the first stage of disk disengagement described above in connection with FIG. 10. In fact, it is preferred that the second stage of disengagement (FIG. 11) be reached without requiring significant deflection of the arch members 44. Accordingly, for use with the conventional configuration of the disk 22, the distance C is preferably not less than 1.4 mm. Also, the distance B is preferably less than the distance A, so that a disk 22 that is engaged on the pedestal 20 does not touch the edge shoulder 30 and may be rotated without significant frictional resistance as an indication that the disk is not being subjected to unwanted strain. It will be understood that the distance B can have a negative value, as when the rigid land surface 46 projects above the base panel portion 19 higher than the edge shoulder 30.

A suitable material for the disk container 10 is polypropylene plastic, in which case a suitable configuration of the arch members 44 is provided when the ring structure 41 has an outside diameter of approximately 32 mm and an inside diameter of approximately 30 mm, the arch members 44 being defined between those diameters and having a crowned cross-sectional upper contour of full radius, having an unsupported length between solid portions of the ring structure 41 of approximately 13 mm. It will be understood that appropriate variations in the above-recited dimensions are contemplated; for example, the outside diameter of the ring structure 41 can be from about 20 mm to about 38 mm, the inside diameter being approximately 2 mm smaller. Also, the unsupported length of the arch members 44 can be from about 12 mm to about 20 mm. At the contact portion 45, the arch members have a cross-sectional depth equivalent to approximately 1 mm, the underside of the arch member being canted with greater thickness at the outside of the ring structure 41 for resisting outward deflection of the contact portion 45 under loading. Specifically, an exemplary configuration of the arch member 44 as shown in the drawings has the underside inclined at an angle of 20°, the outer extremity of the inclined surface being 1.06 mm closer to the base panel portion 19 than the forward extremity of the contact portion 45. (A suitable range for this angle is from approximately 3° to approximately 20°.) Also, the forward extremity of the arch member 44 is arched circumferentially at a radius of approximately 49.19 mm whereas the inclined surface is arched at a smaller radius of approximately 34.62 mm.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A holder for a disk having a central opening and front and back face surfaces, a data region extending inwardly from proximate an outer perimeter of the disk to a diameter of approximately twice that of the central opening, the holder comprising:

(a) a base having a panel portion;
   (b) a pedestal projecting forwardly from the panel portion on a pedestal axis, the pedestal including:
      (i) a central button portion having a plurality of axially extending stem members;
      (ii) a plurality of arm members supporting the retainer members and the stem members of the button portion in cantilevered relation to the base, the arm members collectively having a relaxed position, an engaged position for retaining the disk by engagement of the front face surface by the retainer members proximate the central opening, and a depressed position wherein free end extremities of the arm members are deflected axially rearwardly from the relaxed position in response to applied pressure against the button portion with sufficient radially inward and axially rearward movement of the retainer members and the stem members to permit passage of the retainer members and the stem members through the central opening of the disk; and
      (iii) a ring structure projecting forwardly from the base and having a plurality of circumferentially extending spring portions, each of the spring portions comprising a deflectable arch member, opposite ends thereof being supported relative to the base for biasingly contacting the rear face surface of the disk between the central opening and the data region for urging the disk axially forwardly relative to the retainer portions when the retainer members are engaging the front face surface of the disk and the arm members are moved toward the depressed position, whereby the disk is moved axially forwardly by the spring portions as the arm members reach the depressed position.

2. The holder of claim 1, wherein the arch members are circumferentially located between adjacent arm members.

3. The holder of claim 2, wherein the ring structure further comprises a plurality of skirt members inwardly projecting from proximate respective ones of the arch members between and proximate adjacent pairs of the arm members.

4. The holder of claim 1, wherein the stem portions are integrally formed as button segments with corresponding ones of the retainer members.

5. The holder of claim 4, wherein rearwardly facing engagement surfaces of the retainer members have outwardly and forwardly extending extremity portions for facilitating disengagement from the disk.

6. The holder of claim 4, wherein forwardly facing surfaces of the button surfaces slope forwardly and inwardly from outer extremities of the retainer members to respective forward extremities of the button segments, the forward extremities being sufficiently confined for ramped engagement with the central opening in the relaxed position of the arm members.

7. The holder of claim 1, wherein the arm members are supported by the ring structure, projecting inwardly therefrom.

8. The holder of claim 7, further comprising respective spring hinges connecting corresponding root extremities of the arm members to the ring structure, the arm members deflecting principally at the spring hinges.

9. The holder of claim 7, wherein the ring structure further includes a plurality of skirt members extending between adjacent pairs of the arm members and being closely spaced therefrom for shielding the arm members.

10. The holder of claim 1, wherein the base further comprises an edge support member projecting forwardly from the panel portion, the edge support member having a shoulder surface for contacting the rear surface of the disk proximate a perimeter extremity thereof, a portion of the edge support member extending forwardly of the shoulder surface in concentric relation to the pedestal axis for protecting an edge portion of the disk, the edge support member having a pair of finger depressions formed therein on opposite sides of the pedestal axis for permitting the disk to be gripped by a user's fingers when the disk extends proximate the shoulder surface.

11. The holder of claim 10, wherein the shoulder surface is interrupted by the finger depressions.

12. The holder of claim 10, wherein the shoulder surface is spaced from the disk when the disk is engaged on the pedestal for avoiding strain within the disk.

13. A holder for a disk having a central opening and front and back face surfaces, a data region extending inwardly from proximate an outer perimeter of the disk to a diameter of approximately twice that of the central opening, the holder comprising:

(a) a base having a planar panel portion and an edge support member projecting forwardly from the panel portion, the edge support member having a shoulder surface for contacting the rear surface of the disk proximate a perimeter extremity thereof;

(b) a pedestal projecting forwardly from the panel portion on a pedestal axis, the pedestal including:

(i) a central button portion having a plurality of circumferentially spaced button segments integrally forming respective axially extending stem members and corresponding radially outwardly projecting retainer members;

(ii) a plurality of arm members supporting the retainer members and the stem members of the button portion in cantilevered relation to the base, the arm members collectively having a relaxed position, an engaged position for retaining the disk by engagement of the front face surface by the retainer members proximate the central opening, and a depressed position wherein free end extremities of the arm members are deflected axially rearwardly from the relaxed position in response to applied pressure against the button portion with sufficient radially inward and axially rearward movement of the retainer members and the stem members to permit passage of the retainer members and the stem members through the central opening of the disk; and (iii) a ring structure projecting forwardly from the base and having a plurality of circumferentially extending deflectable arch members, the arch members being located circumferentially between adjacent arm members, opposite ends of the arch members being supported relative to the base for biasingly contacting the rear face surface of the disk between the central opening and the data region for urging the disk axially forwardly relative to the retainer portions when the retainer members are engaging the front face surface of the disk and the arm members are moved toward the depressed position, whereby the disk is moved axially forwardly by the arch members as the arm members reach the depressed position, the arm members being biasingly connected to the ring structure by respective spring hinges, the arm members deflecting principally at the spring hinges, the ring structure further including a plurality of skirt members inwardly projecting from proximate respective ones of the arch members between and proximate adjacent pairs of the arm members, wherein the shoulder surface of the edge support member is spaced from the disk when the disk is engaged on the pedestal for avoiding strain within the disk.

14. A holder for a disk having a central opening and front and back face surfaces, a data region extending inwardly from proximate an outer perimeter of the disk to a diameter of approximately twice that of the central opening, the holder comprising:

(a) a base having a panel portion;

(b) a pedestal projecting forwardly from the panel portion on a pedestal axis, the pedestal including:

(i) a central button portion having a plurality of radially outwardly projecting retainer members and a plurality of axially extending stem members;

(ii) a plurality of arm members supporting the retainer members and the stem members of the button portion in cantilevered relation to the base, the arm members collectively having a relaxed position, an engaged position for retaining the disk by engagement of the front face surface by the retainer members proximate the central opening, and a depressed position wherein free end extremities of the arm members are deflected axially rearwardly from the relaxed position in response to applied pressure against the button portion with sufficient radially inward and axially rearward movement of the retainer members and the stem members to permit passage of the retainer members and the stem members through the central opening of the disk;

(iii) a ring structure projecting forwardly from the base contacting the rear face surface of the disk between the central opening and the data region when the retainer members are engaging the front face surface of the disk and the arm members are moved toward the depressed position; and (iv) a plurality of skirt members inwardly projecting from the arch ring structure between and proximate adjacent pairs of the arm members.

* * * * *